July 7, 1970 A. SPENCER III, ET AL 3,519,886
PROTECTION CIRCUIT FOR OUTPUT POWER DEVICES
Filed Nov. 17, 1967
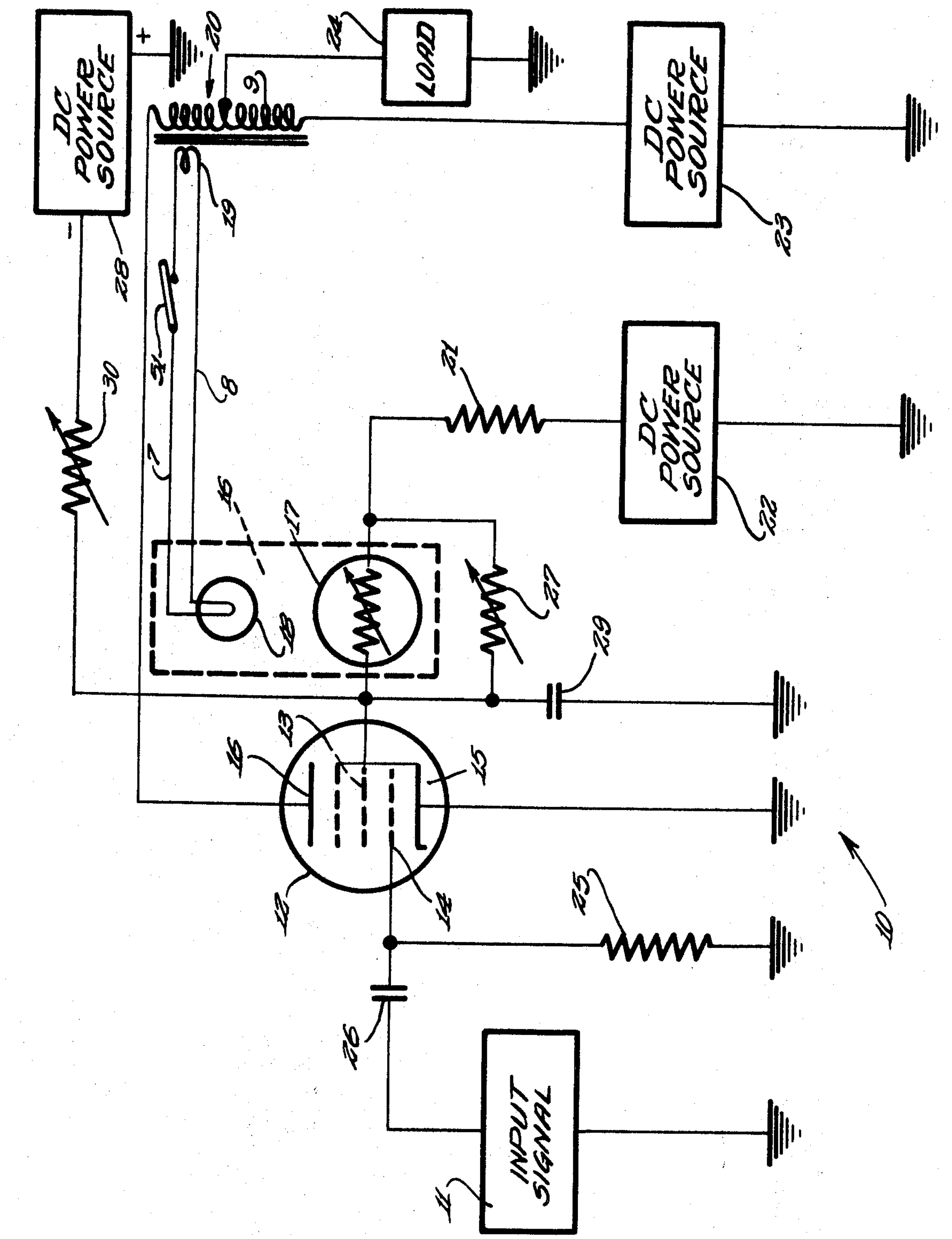
INVENTORS
August Spencer III
Gordon T. Bennett
BY Hill Sherman Meroni Gross & Simpson ATTORNEYS

1

3,519,886
PROTECTION CIRCUIT FOR OUTPUT POWER DEVICES

August Spencer III, and Gordon T. Bennett, Athens, Tex., assignors to Curtis Mathes Manufacturing Company, Dallas, Tex., a corporation of Texas Filed Nov. 17, 1967, Ser. No. 683,922
Int. Cl. G05f *1/40;* H02h *7/20*
U.S. Cl. 317—51 3 Claims

ABSTRACT OF THE DISCLOSURE

A control device for protecting an electronic power device when the input signal is removed so that the electronic device is not destroyed. A photoconductive device controlled by the output of the electronic device is connected in circuit with the electronic device to protect it.

This invention relates in general to a protection circuit and in particular for a new and novel protection circuit utilizing a photoconductive cell controlled by a light emitting source which is energized from the output of the device. In the event of the failure of an input to the device the output is removed thus deenergizing the light source and in turn controlling the resistance of the photoconductive device to protect the electronic circuit in which it is mounted.

This invention relates to a protection circuit for power electron devices which is simple in construction and operation, using very few component parts and is very economical, rugged and reliable.

The circuit of this invention was designed to protect the horizontal output power tube employed in television receivers in an inexpensive, reliable, fully atuomatic manner.

It will be apparent, however, that the invention achieves many other advantages and that many features of the invention are not limited to the above applications.

The most common type of failure on output power devices used in what is known as Class C operation results when the input excitation to the device is removed.

Electromechanical relays, thermal circuit breakers, melting fuses and degenerative networks have been used in the past to protect output power devices from this type of failure but all of these are relatively expensive, inefficient and complex exhibiting attendant servicing and maintenance problems.

The present invention has for its principal object the provision of a system which will simply, inexpensively and reliably protect an output power device from destructive overdissipation.

Another object of this invention is to provide a novel protection circuit which reduces the output of a power device to a non-destructive level when the input disappears.

Yet another object of this invention is to provide a protection circuit for a power device in which a photoconductive device is controlled in response to the output of the power device and is connected to a control element of the power device to protect it.

Yet another object of this invention is to provide an improved protective device for an electron power amplifier.

An important feature of the invention is found in the provision for a photoconductive cell connected in a power amplifier circuit so as to detect the output and control it in response to the output level.

Another feature is the circuit arrangement used to send or detect a failure and thereby activate the protective circuit.

2

A further feature of the invention is that the protective system is fully automatic and does not require human intervention to resume operation such as would be the case with fuses or circuit breakers.

Still another feature of the invention is found in the provision for a light enclosing container with a photoconductive cell mounted therein with a light source and with the photoconductive device connected in circuit with a power amplifier to control it in response to variations in the light source. The light source is energized by the output of the power amplifier such that the power amplifier is protected on failure of an input.

Further objects, features and advantages will become apparent from the following description and claims when read in view of the drawing, in which;

The figure is a schematic view of the novel protection circuit of this invention.

An output power device 12 which may be a pentode tube or any other type of electron device which depends on the presence of a definite potential at a grid other than the control grid to deliver rated power output is shown in the figure.

An input signal source 11 is coupled through a capacitor 26 to the control grid 14 of the pentode 12. A resistance 25 is connected from grid 14 to ground and constitutes the grid leak, in conjunction with capacitor 26, whereby the stage is operated class C with suitable drive.

The cathode 15 of tube 12 is connected directly to ground. The plate 16 of the pentode tube is connected to the primary 9 of a transformer through which current from a DC power source 23 is fed. Transformer 20 couples the output signal generated by the pentode 12 to a load 24.

The screen grid 13 of the power electron device 12 is fed from a DC power source 22, which could be the same that feeds the plate, through a resistor 21 in series with a photoconductive cell 17. The screen grid 13 is also by-passed to ground by a capacitor 29. A light emitting device 18 is enclosed together with the photoconductive cell 17 in a container 16 so that extraneous light cannot impinge on the cell.

The terminals of the light emitter 18 are connected by leads 7 and 8 to a sensing circuit comprising a pickup coil 19 which forms a secondary of transformer 20.

Initial adjustment of the circuit allows automatic self starting of the stage when it is safe to do so. This is accomplished by disconnecting the light emitting device 18 from the pickup coil 19 which will make the photoconductive cell resistance very high resulting, in turn, in a low value of screen voltage. A switch is connected in wire 7 for this purpose.

The screen grid voltage is adjusted on one hand to a value low enough that when the input signal 11 is not present plate current is limited to a safe value. On the other hand, the screen grid voltage should be positive enough so that with the light emitting device 18 connected to the pickup coil 19 (switch 51 closed) full power output is obtained when the input signal 11 is applied to the amplifier.

Screen voltage adjustment is accomplished by varying resistance 27 and/or resistance 30, the latter being connected to a negative voltage source 28.

Operation of the system is then as follows: When the amplifier is first turned on, the light emitting device 18 is off since there is no output signal at the transformer 20. The photoconductor 17 has a high resistance under these conditions and the screen grid voltage is at a low value protecting the output from overdissipation. When the input signal 11 is applied, an output signal will be developed at the output transformer 20. This output signal will be sensed by the pickup coil 19 lighting up the light emitting device 18.

This causes the photoconductor 17 to decrease in resistance appreciably, raising the screen voltage and, in turn, increasing the signal at the output transformer. The cycle is repeated until a steady state condition is reached at which the resistance value of the photoconductor is very small and full power output is delivered to the load 24.

If the input signal 11 is removed, no output signal will be produced in the transformer 20. Consequently, the light emitting device 18 will be turned off and the photoconductor 17 would increase in resistance to its dark value. Such a high resistance would lower the screen voltage to that previously set thus protecting the output power electron device from overdissipation.

It can be seen, that any type of circuit failure which causes the output signal to decrease appreciably will cause the photoconductor 17 to increase its resistance and therefore limit the dissipation of the output power device to a safe value.

Note that resistor 27 is variable only during development stages and may be fixed in value in a practical circuit. Note also that DC power source 28 and resistor 30 are not always necessary, and may or may not be present, and that resistor 30 may or may not be variable if it is present.

Although the invention has been described with respect to a preferred embodiment, it is not to be so limited as changes and modifications may be made which are within the full intended scope as defined by the appended claims.

We claim:

1. A protective circuit for a pentode tube power amplifier, comprising a photoconductive device connected to the screen grid electrode of said power amplifier, a source of bias potential connected in series with said photoconductive device, an input signal connected to a second electrode of said power amplifier, a transformer with its primary connected to a third electrode of said power amplifier, and light emitting device in operative association with the photoconductive device and connected to the secondary of the transformer.

2. A protective circuit according to claim 1 comprising an impedance connected in parallel with said photoconductive device.

3. In apparatus according to claim 1 wherein the light emitting device and the photoconductive device are enclosed in a light sealing container.

References Cited

UNITED STATES PATENTS

| | | | |
|---|---|---|---|
| 2,414,686 | 1/1947 | Badmaieff | 323—21 X |
| 2,779,897 | 1/1957 | Ellis | 323—21 X |
| 2,808,559 | 10/1957 | Engle | 323—21 |

JAMES D. TRAMMELL, Primary Examiner

U.S. Cl. X.R.

323—21; 330—59